United States Patent [19]
Boyd et al.

[11] Patent Number: 4,717,243
[45] Date of Patent: Jan. 5, 1988

[54] BISTABLE LIQUID CRYSTAL DISPLAY UTILIZING PRIMING VOLTAGES

[75] Inventors: Gary D. Boyd, Rumson; Julian Cheng, Little Silver, both of N.J.

[73] Assignee: American Telephone and Telegraph Company AT&T Bell Laboratories, Murray Hill, N.J.

[21] Appl. No.: 843,855

[22] Filed: Mar. 21, 1986

Related U.S. Application Data

[63] Continuation of Ser. No. 411,305, Aug. 25, 1982, abandoned.

[51] Int. Cl.$^4$ .................. G02F 1/137; G09G 3/36
[52] U.S. Cl. ................... 350/332; 340/784; 350/346
[58] Field of Search ............ 358/230; 350/346, 340, 350/341, 332; 340/784

[56] References Cited

U.S. PATENT DOCUMENTS

| | | | |
|---|---|---|---|
| 3,806,230 | 4/1974 | Haas | 350/346 |
| 3,936,815 | 2/1976 | Kogure | 350/346 X |
| 4,139,273 | 2/1979 | Crossland et al. | 350/340 |
| 4,158,860 | 6/1979 | Irie | 358/230 |
| 4,239,348 | 12/1980 | Berreman et al. | 350/346 |
| 4,333,708 | 6/1982 | Boyd et al. | 350/346 |
| 4,367,924 | 1/1983 | Clark et al. | 350/346 |
| 4,400,060 | 8/1983 | Cheng | 350/340 X |

OTHER PUBLICATIONS

J. Cheng et al., "Threshold and Switching Characteristics of a Bistable Nematic Liquid-Crystal Storage Display," Appl. Phys. Lett., 37(12), pp. 1072-1074, (1980).
G. D. Boyd et al., "Liquid-Crystal Orientational Bistability and Nematic Storage Effects," Appl. Phys. Lett. 36(7), pp. 556-558 (1980).
J. Cheng, "Surface Pinning of Disclinations and the Stability of Bistable Nematic Storage Displays," J. Appl. Phys., 52(2) pp. 724-727 (1981).

*Primary Examiner*—Stanley D. Miller
*Assistant Examiner*—David Lewis
*Attorney, Agent, or Firm*—Bernard Tiegerman

[57] ABSTRACT

Threshold electric fields required to achieve high speed matrix addressing of selected cells in a bistable nematic liquid crystal storage display are reduced by employing a short duration, priming pulse signal in accordance with the principles of the invention. The short priming pulse signal applied to a selected cell modifies the binding energy for disclinations attached to sites of orientational discontinuity, thereby changing the threshold field required for electrical switching between bistable states. Threshold reduction also depends on the AC frequency and duration of a writing pulse signal applied to the selected cell subsequent to the priming pulse signal.

13 Claims, 6 Drawing Figures ize orientational director alignment into a horizontal configuration. It should be noted that other techniques such as mechanical shear and the like are also suitable for inducing horizontal to vertical alignment switching.

BISTABLE LIQUID CRYSTAL DISPLAY UTILIZING PRIMING VOLTAGES

This application is a continuation of application Ser. No. 411,305, filed Aug. 25, 1982, now abandoned.

TECHNICAL FIELD

This invention relates to electrically addressed bistable liquid crystal devices.

BACKGROUND OF THE INVENTION

Matrix addressing of a bistable nematic liquid crystal storage display has been demonstrated with continuous strip electrodes using a combination of thermal erasure and electric field effect threshold switching for writing. Storage properties of the display are based on bistable orientational director configurations which possess intrinsic memory in the absence of a holding potential. See U.S. patent application, Ser. No. 375,670 (G. Boyd et al. Case 22-4) filed May 6, 1982.

In this type of display, the speed at which each display cell is addressed and, thereby, switched in alignment is directly proportional to the magnitude of the applied potential or, equivalently, the strength of the applied electric field. That is, increased addressing speeds are attainable when the applied potential exceeds the increased threshold potential at which orientational director switching occurs. Applied potentials necessary for high speed addressing are sufficiently large to limit the applicability of liquid crystal displays for high speed matrix addressing purposes.

SUMMARY OF THE INVENTION

High speed addressing of bistable nematic liquid crystal display cells is achieved with reduced levels of applied potential by applying a low amplitude priming potential to a selected display cell prior to switching the state of the selected cell. The priming pulse distorts a stable orientational director configuration in such a way that a junction at which disclinations are pinned is compressed within a boundary layer dimensionally equivalent in thickness to the electric coherence length, $\xi$. State switching of the cell is carried out by applying a writing potential not less than a primed threshold switching potential to the selected cell.

In one embodiment of the invention, bistable nematic liquid crystal display cells are addressed by continuous uniform strip electrodes arranged orthogonal to each other on opposing substrates of the display. A small vertical electric field is imposed on a selected cell to distort a symmetric horizontal orientational director alignment near one substrate. Subsequently, a larger vertical electric field is applied to the selected cell to allow the directors to switch to a vertical alignment. In this embodiment, millisecond addressing speeds are achieved at potentials substantially less than threshold switching potentials where no prior priming pulse is employed.

BRIEF DESCRIPTION OF THE DRAWINGS

A more complete understanding of the invention may be obtained by reading the following description of a specific illustrative embodiment of the invention in conjunction with the appended drawings in which.

DETAILED DESCRIPTION

Figure 1:
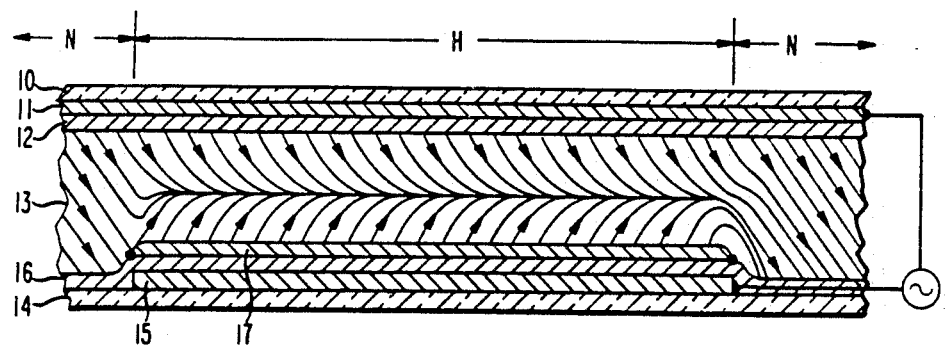
FIG. 1 shows, in cross section, a bistable nematic liquid crystal display cell in which the liquid crystal material exhibits a horizontal orientational director alignment.

The liquid crystal display cell shown in crosssectional view in FIG. 1 includes substrates 10 and 14, conductors 11 and 15, topographically textured tilt alignment surfaces 12, 16 and 17, and nematic liquid crystal material 13. Additionally, specific regions are shown above the display cell to identify configurations of the orientational directors of liquid crystal material 13. The configurations identified in FIG. 1 are horizontal (H) and neutral (N).

Substrates 10 and 14 support conductors 11 and 15 as well as provide a means for containing liquid crystal material 13. Each substrate is composed primarily of a transparent dielectric material such as silicon dioxide or glass or the like.

Conductors 11 and 15 are disposed on the inner surface of each respective substrate in order to permit at least an electric field to be imposed substantially perpendicular to each substrate. Both interdigital electrodes and continuous uniform strip electrodes are arrangements suitable for use as conductors 11 and 15.

As shown in FIG. 1 for illustrative purposes only, conductors 11 and 15 are continuous uniform strip electrodes orthogonally disposed with respect to each other. Conductor 11 is formed on an inner surface of substrate 10, while conductor 15 is similarly formed on an inner surface of substrate 14 in a direction orthogonal to the direction of conductor 11. Each conductor is deposited or etched by conventional photolithographic techniques as a thin film on the inner surface of the respective substrate. Transparent films such as indium tin oxide are used as conductors in transmission mode display cells, whereas opaque films comprised of aluminum, for example, are used as conductors in reflective mode display cells.

As stated above, it is necessary for conductors 11 and 15 to facilitate generation of a vertical electric field through liquid crystal material 13, that is, a field substantially perpendicular to each substrate. This type of field causes liquid crystal material 13 to assume a vertical orientational director alignment (see FIG. 5) provided that the field strength exceeds a known threshold level. In practice it is also necessary to switch the director alignment from vertical to horizontal. Thermal or electric field effects are well suited to this type of switching based upon the type of conductors being employed. Horizontal electric fields may be applied to liquid crystal material 13 by interdigital electrode conductors. See, for example, U.S. Pat. No. 4,333,708 issued to G. D. Boyd et al. on June 8, 1982. For uniform strip electrode conductors as shown in FIG. 1, vertical to horizontal alignment switching is performed electrothermally by resistive heating to melt the liquid crystal material into the isotropic state and by cooling to preferentially orient the liquid crystal material into the horizontal alignment. This technique is described in our copending U.S. patent application, Ser. No. 375,670 (G. D. Boyd et al. Case 22-4), filed May 6, 1982 now U.S. Pat. No. 4,472,026.

Tilt alignment surfaces 12 and 16 are transparent, obliquely deposited oxide layers on the exposed inner surfaces of the substrates and conductors for defining surface alignment of liquid crystal material 13. The topography of surfaces 12 and 16 defines a surface tilt angle $\theta_0$ measured from the substrate normal in the range 22.5 degrees of 67.5 degrees.

Tilt alignment surface 17 is deposited substantially over conductor 15 to form a reverse tilt condition with respect to surfaces 12 and 16. That is, the topography of surface 17 exhibits a surface tilt angle of $-\theta_0$ from the substrate normal. Reverse tilt causes orientational discontinuities to exist where the lateral edges of surface 17 meet surface 16. Discontinuities are shown as small darkened circular areas in FIGS. 1, 4 and 5.

Liquid crystal material 13 is a mixture of a nematic liquid crystal substance with a pleochroic dye material for optical differentiation of the orientational director alignments. In one exemplary display cell, liquid crystal material 13 is comprised of cyanobiphenyl samples (E7 from Merck Chemical Company) doped with 0.5 to 2.0 percent pleochroic dye (D5 from Merck) and is placed between the substrates wherein the surface to surface separation of the substrates is 10 to 50 $\mu$m and, typically, 20 $\mu$m. Liquid crystal material 13 exhibits positive dielectric anisotropy. Material 13 may also be an undoped material exhibiting positive dielectric anisotropy for which polarizer and analyzer pairs are used to obtain optical differentiation.

It has been found that, for certain substrate configurations, it is preferable to add some liquid crystals material in the cholesteric mesophase to the nematic material in order to properly bias the bulk orientational configuration with a homogeneous twist chirality, thereby preventing the impairment of optical properties by the existence of mixed chirality twist domains and twist walls.

Liquid crystal material 13 is illustrated in FIG. 1 as being in a horizontal orientational director alignment in the region defined by the overlap of conductors 11 and 15. Surrounding the region of horizontal alignment are neutral isolation regions. Neutral isolation regions are volumes of liquid crystal material which maintain a fixed orientational director configuration when an adjacent bistable cell assumes either of the two stable ordered states, that is, a horizontal alignment or a vertical alignment. These regions surround individual cells in order to separate, isolate and stablize the cells of the display device. A theory of neutral isolation regions is explained by J. Cheng in "Surface Pinning of Disclinations and the Stability of Bistable Nematic Storage Displays," J. Appl. Phys. 52, pp. 724–727 (1981). Also, in this regard, the material contained in U.S. patent application, Ser. No. 252,148, now U.S. Pat. No. 4,400,060, filed Apr. 8, 1981, by J. Cheng entitled "Cell Isolation in Bistable Nematic Liquid Crystal Cells," is expressly incorporated herein.

Additional information concerning operation, physical aspects and construction of the display cell of FIG. 1 is contained in U.S. Pat. No. 4,333,708 and copending U.S. patent application, Ser. No. 375,670, now U.S. Pat. No. 4,472,026, filed May 6, 1982. In this regard, pertinent materials from each of the above cited references are expressly incorporated herein by reference.

Data entry to the display cell, also referred to as writing of the cell, is achieved by supplying write pulse signals to conductors 11 and 15. Write pulse signals for the arrangement shown in FIG. 1 are usually AC signals capable of imposing an electric field through liquid crystal material 13 normal to the substrate surfaces. The imposed electric field causes horizontally aligned orientational directors to switch to vertical alignment provided that the field exceeds a specified switching threshold level for at least some minimum amount of time.

Figure 2:
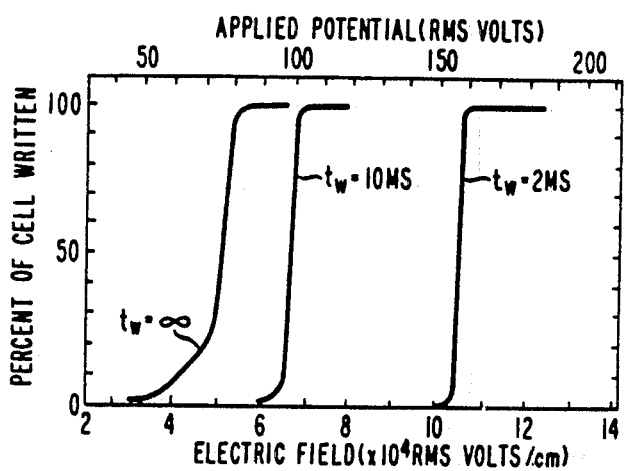
FIG. 2 presents AC switching characteristic curves for write pulse signals of different durations.

Horizontal to vertical alignment AC switching characteristics for the display cell in FIG. 1 are shown in FIG. 2 wherein the duration of the applied field is varied from 2 msec to (6 sec.). Switching was initiated by constant envelope gated AC write pulse signals having a pulse duration, $t_w$. The applied potential or, equivalently, the applied electric field strength developed between conductors 11 and 15 in response to the write pulse signals on the conductors is plotted versus the percent of the cell written for the particular write pulse signals. It should be noted that the frequency of each pulse signal was 1.0 kHz. Furthermore, each cell was partitioned into a 16×16 array of 40 $\mu$m square subcells surrounded by 10 $\mu$m wide neutral isolation regions to localize cell defects to one or several subcells without impairing the overall switching operation of the entire cell.

As shown in FIG. 2, substantially infinite duration write pulse signals ($t_w = \infty$, where $\infty$ is a duration greater than or equal to 6 seconds) give rise to a minimum threshold field whose strength is determined by the pinning strength of disclinations along the periphery of each cell. For finite duration write pulse signals ($t_w < \infty$), the threshold field strength is shifted toward higher levels as the pulse duration, $t_w$, decreases. One consequence of a pulse duration dependent threshold is that increasingly large electric fields are required to achieve faster addressing rates and, thereby, faster switching speeds for the liquid crystal display cell as addressed by the write pulse signals described in relation to FIGS. 1 and 2.

Figure 3:
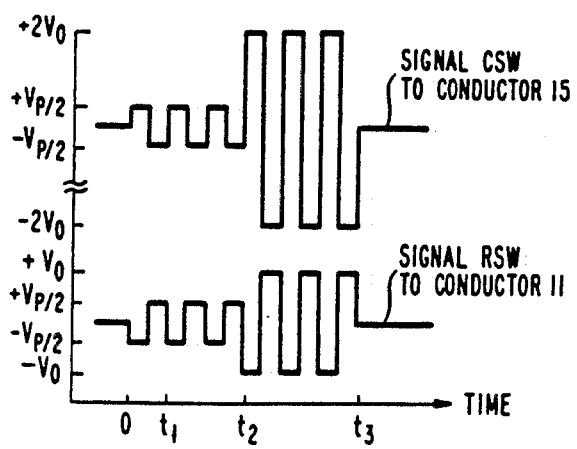
FIG. 3 shows an exemplary set of combined priming and write pulse signals adapted for application to the conductors in the cell shown in FIG. 1.

In accordance with the principles of the invention, high speed addressing is achieved with significantly reduced threshold field strengths and applied potentials by applying switching signals RSW and CSW of FIG. 3 to conductors 11 and 15 of the display cell (FIG. 1), respectively. Switching signals RSW and CSW are individually comprised of a priming pulse signal and a write pulse signal. Each priming pulse signal is characterized by a substantially constant envelope of magnitude $V_p/2$ volts subsisting for $t_2$ seconds; each write pulse signal is also characterized by a substantially constant envelope of duration $t_w = (t_3 - t_2)$ seconds.

An exemplary set of switching signals, as shown in FIG. 3, may be from a class of gated AC signals having frequency $1/t_1$ Hz. Other AC signals capable of producing a constant envelope are preferred to constant amplitude signals because constant amplitude switching signals give rise to space charge polarization effects which reduce the amplitude of the applied field. Signals CSW and RSW will be discussed in more detail below in references to FIGS. 4 and 5.

Figure 4:
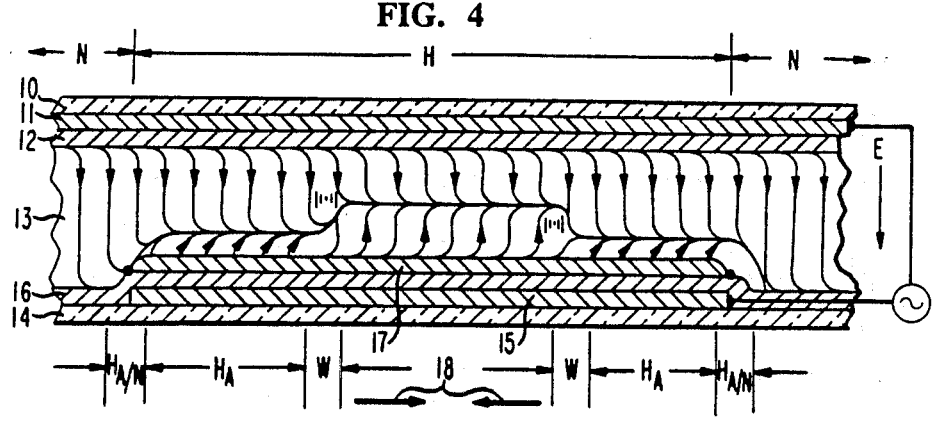
FIGS. 4 and 5 illustrate orientational director realignment for the cell of FIG. 1 under the influence of the electric field induced by the signals of FIG. 3.

FIG. 4 illustrates the behavior of liquid crystal material 13 under the influence of an applied electric field E (direction of field shown by arrow) caused by the priming pulse portions of signals CSW and RSW. Several new regions are shown in FIG. 4: namely, $H_A/N$ as an interface between a neutral isolation region and a region of asymmetric distorted horizontal orientational director alignment ($H_A$) and W as a domain wall between regions of symmetric and asymmetric distorted horizontal orientational director alignment, $H_S$ and $H_A$, respectively.

When a bistable region of the display cell is subjected to electric field E caused by the priming pulse portions of signals CSW and RSW applied to conductors 15 and 11, respectively, the alignment of liquid crystal material 13 is distored within boundary layers near surfaces 12 and 17. Distortions are progressively compressed within multiple boundary layers of dimension $\xi$, the electric coherence length, as the applied field is increased, while the bulk of liquid crystal material 13 aligns parallel to the electric field. Splay-bend distortions cause $\phi$, the angle of local molecular orientation measured from the normal to each substrate, to be in the range $\phi_0 \leq \phi \leq \pi/2$ within a distance $\xi/2$ of surfaces 12, 16 and 17. Additionally, it is noted that a horizontal orientational director line ($\phi = \pi/2$) is disposed at midplane of the display cell in region $H_S$, within a boundary layer of thickness $\xi$, whereas the horizontal orientational director line in region $H_A$ is disposed near the tilt alignment surface at which disclinations are pinned, i.e., surface 17.

In order to successively distort a horizontal alignment into an asymmetric distorted horizontal alignment, the applied priming potential, $V_p$, generating electric field E must be greater than a critical voltage $V_c$. For the display cells described herein, voltage $V_c$ is in the range of 1.0 to 2.0 volts for liquid crystal material 13 being comprised of cyanobiphenyl samples having dielectric anisotropy $\Delta \epsilon$ approximately equal to 13. It should be noted that the critical voltage $V_c$ changes as a function of $\Delta \epsilon$. A more complete explication of critical voltage $V_c$ is provided by J. Cheng et al. in J. Appl. Phys., Vol. 52(4), pp. 2756–2765 (1981).

When a priming potential greater than $V_c$ is applied to the display cell, molecular dynamics in liquid crystal material 13 initially transform a horizontal alignment into the symmetric distorted horizontal alignment, $H_S$, for a short period of time. For a low potential $V_p$ in excess of $V_c$, for example, $V_p$ in the range of 2.0 to 5.0 volts for the cyanobiphenyl sample, the bulk of liquid crystal material 13 subject to the applied potential is transformed from $H_S$ into asymmetric distorted horizontal alignment $H_A$ by vertical movement of the horizontal orientational director line. For even larger applied poentials $V_p$ greater than $V_c$, for example, $V_p$ greater than 5.0 volts, domain walls W are formed at the periphery of the active region of the cell and propagate inward from the cell perimeter to transform an $H_S/N$ interface into an $H_A/N$ interface as it does so. The inward direction of domain wall W propagation is shown by arrows 18.

Figure 5:
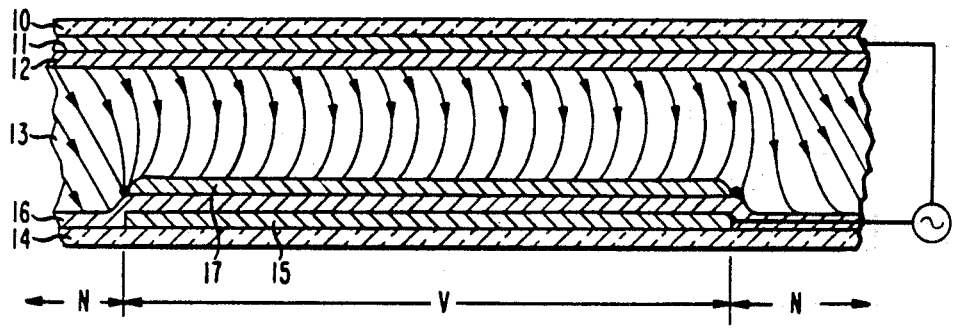

Reorientation of liquid crystal material 13 in the vicinity of the pinning sites (darkened circular areas) into either an $H_A$ alignment or a combination of $H_A$ and $H_S$ alignments described above reduces the threshold potential necessary for switching the display cell into the vertical alignment shown in FIG. 5. This occurs because there is a difference in stress at an $H_S/N$ interface versus at an $H_A/N$ interface. The stored distortion energy at the former, a twist or Bloch wall, is lower than the stored distortion energy at the latter, a splay-bend wall. Thus, the $H_A/N$ interface requires a lower threshold field after sufficient priming than the H/N interface without priming.

Specifically, the Bloch wall (twist), W, is a means of relieving the stress at a $H_S/N$ interface with otherwise contains a splay-bend wall. As long as the Bloch wall remains at the $H_S/N$ interface, it lowers the energy at the interface and stabilizes that interface. When an electric field is applied to liquid crystal material 13, bulk energy differences force the wall to move inward to the center of the cell as $H_S$ is replaced by $H_A$. This movement raises the energy and increases the stress at the new interface as $H_A/N$ replaces $H_S/N$ causing destabilization at the interface and thereby lowering the threshold field. These changes commence when the domain wall W starts to move and are complete when the domain wall W is no longer within the interaction range of the pinning site.

Since stresses are relaxed because of the existence of the domain wall W, its presence stabilizes the pinning site and inhibits dislocation of disclinations from pinning sites until domain wall W has moved a sufficient distance away from the pinning site so that interaction between the domain wall and the pinning site is ineffective in relieving stress. A distance, l, satisfies this condition and is estimated by the geometric mean of the dimension of the domain wall and the twist coherence length $\xi_2$. Since domain wall W moves into the interior of the display cell under influence of the field caused by the priming potential at the rate of several microns per second for the cyanobiphenyl sample, domain wall W can traverse distance l<2 $\mu$m in not less than 100 msec. Hence, the priming portions of signals CSW and RSW are required to subsist for $t_2 \geq 100$ msec in the cyanobiphenyl sample.

FIG. 5 shows the display cell oriented in a vertical alignment after application and extinction of write pulse portions of signals CSW and RSW, i.e., after time $t_3$. The transition from $H_A$ to vertical or from a combined $H_A/H_S$ alignment (FIG. 4) to vertical is caused by the self-propelled shrinkage and annihilation of the free floating disclination loop under the influence of an electric field imposed by the write pulse signals. The strength of this AC electric field caused by the write pulse signals is significantly less than the strength of a similar frequency and duration field imposed without a prior priming field as shown in FIG. 6.

Figure 6:
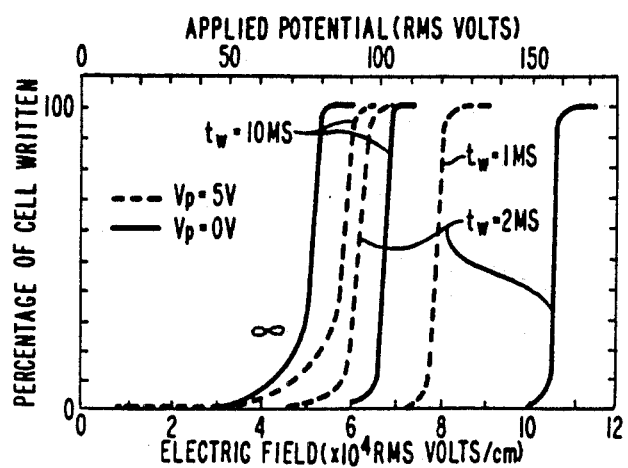
FIG. 6 shows a comparison of AC switching characteristics for an unprimed display cell vs. a primed display cell.

The results shown in FIG. 6 are based upon the display cell parameters given above in reference to FIG. 2 wherein the AC field is at a frequency of 1 kHz ($1/t_1$). For example, a primed cell can be totally addressed and switched with a 2.0 msec ($t_w$) write pulse signal at 100 volts ($3V_0$) applied potential rather than 155 volts ($3 V_0$) for an unprimed cell. It is clear from FIG. 6 that millisecond addressing speeds are capable of being achieved at a lower applied potential or electric field strength when priming signals are employed to distort the molecular alignment of liquid crystal material 13.

Another advantage from employing a priming pulse signal in this type of display cell is apparent in multiplexed operation such as 2:1 or 3:1 multiplexing. To wit, a lower nonselect signal level for the primed display, e.g., 34 volts vs. 55 volts for 2.0 msec ($t_w$) addressing, ensures switching operation away from the tail of the threshold curve to reduce spurious switching by surface defects. Hence, switching with lower electric fields is achieved without sacrificing addressing speed.

Although only a single embodiment of the invention has been described, it will be apparent to a person skilled in the art that various modifications to the details shown and described may be made without departing from the spirit and scope of the invention. For example, simplification of the design for the signal source in the generation of signals CSW and RSW may be made when the priming potential $V_p$ is made equal to $V_0$, one third of the writing potential. Furthermore, when dealing with a large array of display cells, it becomes practical to apply an initial priming potential to the entire array rather than individually to each cell in sequence.

What is claimed is:

1. A liquid crystal display, comprising:
   liquid crystal material disposed between first and second substrates, said liquid crystal material being switchable from a first configuration to a second, different configuration through the application, over a finite time period, of a single electric field having an amplitude equal to or greater than a threshold amplitude related to said finite time period; and
   switching means for electrically switching at least a portion of said liquid crystal material from said first configuration to said second configuration, Characterized In That
   said switching means includes means for applying at least a first electric field to said liquid crystal material in said first configuration during a first time period and at least a second electric field during a second time period which is subsequent to said first time period, said first field exhibiting a first, nonzero amplitude and said second field exhibiting a second, nonzero amplitude greater than said first amplitude, said liquid crystal material exhibiting the identical sign for the dielectric anisotropy of identical sign, when subjected to said first and second fields, and said first field and first time period being chosen to produce a distortion of said first configuration of said portion and said second field and second time period being chosen to switch said portion from said distorted first configuration to said second configuration.

2. The liquid crystal display of claim 1 wherein said first electric field is caused by a first potential difference between said substrates, said first potential difference being greater than a minimum potential difference needed to produce said distortion of said first configuration but less than a threshold switching potential difference corresponding to said threshold field.

3. The liquid crystal display of claim 2 wherein said second electric field is created by a second potential difference between said substrates, said second potential difference being greater than said first potential difference but less than said threshold switching potential difference.

4. The liquid crystal display of claim 3 wherein said means for generating said first and second electric fields across said portion includes at least first and second conductors arranged on the first and second substrates, respectively, and means for generating, and imposing between said first and second conductors, said first potential difference.

5. The liquid crystal display of claim 4 wherein said means for generating said first and second electric fields across said portion further includes means for generating, and imposing between said first and second conductors, said second potential difference.

6. The liquid crystal display of claim 5 wherein the interior surface of the first substrate and the interior surface of the second substrate have deposited thereon respective topographically textured layers to form a reverse tilt alignment geometry in at least a region of liquid crystal material adjacent to said portion.

7. The liquid crystal display of claim 6 wherein a surface tilt angle $\theta_0$ on each topographically textured layer of the substrates is in the range from 22.5 degrees of 67.5 degrees, inclusively.

8. The liquid crystal display of claim 1 wherein said liquid crystal material includes a pleochroic dye.

9. The liquid crystal display of claim 1 wherein said liquid crystal material includes liquid crystal material in the cholesteric mesophase.

10. The liquid crystal display of claim 1 wherein the amplitude of said second field is less than the threshold amplitude corresponding to said second time period.

11. The liquid crystal display of claim 1 wherein said liquid crystal material includes liquid crystal material in the nematic mesophase.

12. The liquid crystal display of claim 1 wherein said liquid crystal material exhibits first and second, positive dielectric anisotropies when subjected to, respectively, said first and second fields.

13. The liquid crystal display of claim 1 wherein said liquid crystal material exhibits first and second, negative dielectric anisotropies when subjected to, respectively, said first and second fields.

* * * * *